(12) United States Patent
Cho et al.

(10) Patent No.: US 10,384,754 B2
(45) Date of Patent: Aug. 20, 2019

(54) AZIMUTH THRUSTER SYSTEM DRIVEN BY COOPERATING PRIME MOVERS AND CONTROL METHOD

(71) Applicants: Sangha Cho, Ann Arbor, MI (US); Hanwoo Cho, West Lafayette, IN (US); Whang Cho, Seoul (KR)

(72) Inventors: Sangha Cho, Ann Arbor, MI (US); Hanwoo Cho, West Lafayette, IN (US); Whang Cho, Seoul (KR)

( * ) Notice: Subject to any disclaimer, the term of this patent is extended or adjusted under 35 U.S.C. 154(b) by 4 days.

(21) Appl. No.: 15/811,783

(22) Filed: Nov. 14, 2017

(65) Prior Publication Data

US 2019/0144092 A1 May 16, 2019

(51) Int. Cl.
| | |
|---|---|
| *B63H 5/125* | (2006.01) |
| *B63H 25/02* | (2006.01) |
| *F16H 1/02* | (2006.01) |
| *B63H 1/08* | (2006.01) |
| *B63H 23/28* | (2006.01) |
| *B63H 23/34* | (2006.01) |
| *B63H 11/00* | (2006.01) |
| *B63H 21/20* | (2006.01) |
| *B63H 21/17* | (2006.01) |
| *F16H 1/22* | (2006.01) |
| *F16H 37/06* | (2006.01) |
| *F16H 7/02* | (2006.01) |

(52) U.S. Cl.
CPC ............ *B63H 5/125* (2013.01); *F16H 1/222* (2013.01); *F16H 7/02* (2013.01); *F16H 37/065* (2013.01); *B63H 2005/1254* (2013.01)

(58) Field of Classification Search
CPC ........ B63H 5/125; B63H 21/17; B63H 21/20; B63H 1/08; B63H 11/00; B63H 23/24; B63H 5/10; B63B 49/00; F16H 61/02
See application file for complete search history.

(56) References Cited

U.S. PATENT DOCUMENTS

| | | | | |
|---|---|---|---|---|
| 2,045,613 | A | * | 6/1936 | Padgett .................. F16H 61/02 475/116 |
| 3,093,961 | A | * | 6/1963 | Pietro .................... B63H 11/10 418/193 |
| 3,094,967 | A | | 6/1963 | Willis, Jr. |
| 4,580,517 | A | | 4/1986 | Lundberg |

(Continued)

FOREIGN PATENT DOCUMENTS

| | | |
|---|---|---|
| EP | 159144 A1 | 10/1985 |
| WO | WO2012035913 A1 | 3/2012 |

*Primary Examiner* — Yuri Kan
(74) *Attorney, Agent, or Firm* — Fish & Richardson P.C.

(57) ABSTRACT

An azimuth thruster system includes a pod configured to rotate relative the hull of the ship about an azimuthal axis of the pod, a propeller shaft extending from the pod and being configured to rotate relative to the pod about a central axis of the propeller shaft, an outer shaft disposed at least partially in the pod and configured to be driven by a first primary prime mover, an inner shaft disposed at least partially within the outer shaft and configured to be driven by a second primary prime mover, and a pod gear unit disposed within the pod and coupled to the outer shaft, the inner shaft, and the propeller shaft. The outer and inner shafts are configured to rotate at least one of the pod and the propeller shaft based on directions and magnitudes of the torques generated by the first and second primary prime movers.

15 Claims, 12 Drawing Sheets

(56) References Cited

U.S. PATENT DOCUMENTS

| | | | |
|---|---|---|---|
| 4,634,389 A | | 1/1987 | Eptaminitakis |
| 5,009,621 A | * | 4/1991 | Bankstahl ................ B63H 5/10 |
| | | | 416/129 |
| 5,836,795 A | | 11/1998 | Kaul et al. |
| 5,931,110 A | * | 8/1999 | Yamamoto .............. B63B 49/00 |
| | | | 114/144 C |
| 6,224,441 B1 | * | 5/2001 | Kabakov .................. B63H 1/08 |
| | | | 244/19 |
| 6,478,543 B1 | * | 11/2002 | Tuchscherer .......... B63H 23/34 |
| | | | 416/134 R |
| 6,685,516 B2 | | 2/2004 | Tsuboguchi |
| 6,899,576 B2 | | 5/2005 | Reuter et al. |
| 7,585,195 B2 | | 9/2009 | Vartdal |
| 9,346,526 B2 | | 5/2016 | Ottosson et al. |
| 2004/0132360 A1 | * | 7/2004 | Kabakov .................. B63H 1/08 |
| | | | 440/93 |
| 2007/0123118 A1 | | 5/2007 | White et al. |
| 2009/0141254 A1 | | 6/2009 | Watabe et al. |
| 2012/0129411 A1 | | 5/2012 | Kodera et al. |
| 2013/0115832 A1 | * | 5/2013 | Suzuki ................... B63H 21/14 |
| | | | 440/1 |
| 2013/0115833 A1 | * | 5/2013 | Suzuki .................... B63H 1/16 |
| | | | 440/2 |
| 2014/0322021 A1 | | 10/2014 | Ottosson et al. |

* cited by examiner

AZIMUTH THRUSTER SYSTEM DRIVEN BY COOPERATING PRIME MOVERS AND CONTROL METHOD

TECHNICAL FIELD

This disclosure relates generally to a ship propulsion system and in particular to the azimuth thruster system.

BACKGROUND

An azimuth thruster system can be operated by mechanical architectures called Z-drive or L-drive. The Z-drive or L-drive may include a power source (e.g., a prime mover) for propeller thrust installed inside a hull, and power from the power source may be transmitted to the propeller through a drive train including at least one pair of bevel gears located inside a pod that is rotatably mounted to the hull. The Z-drive or L-drive may further include an azimuth controller for controlling an orientation (e.g., azimuth) of the propeller thrust by turning the pod about a vertical axis (e.g. an azimuthal axis) relative to the hull of the ship.

However, there may be drawbacks in azimuth thruster systems including the Z-drive or L-drive. In some examples where the mechanical architecture uses a single power drive train from a prime mover to a propeller, the torque delivered by the prime mover may be applied not only to the propeller shaft through bevel gear engagement inside the pod but also onto the pod. For example, the torque generated by the prime mover is initially transmitted vertically and then redirected horizontally through engagement of two bevel gears inside the pod. In this example, it may be difficult to maintain or change orientation of the pod without applying a supplementary torque that can counteract the torque inevitably imposed vertically onto the pod in an effort to drive the propeller using the prime mover fixed inside the hull.

A purpose of an independent azimuth control system in the Z-drive or L-drive systems may include counteracting this unwanted torque imposed onto the pod during maintaining constant azimuth and delivering azimuth control torque by overcoming this unwanted torque when a change of azimuth is demanded. In some examples, even when there is no need for azimuthal change of the pod, the azimuth control system may waste some energy in generating the counteracting torque that has a magnitude directly proportional to a magnitude of the torque required to drive the propeller, unless there is an extra braking system that can be engaged to keep the azimuth constant. This in turn implies that the azimuth control system may be continuously exposed to some mechanical stresses that can be built up internally during a propeller operation, for example, in a ring and pinion gear system utilized in the azimuth control system. The torque and stress burden may be distributed by employing multiple prime movers in an azimuth control system. However, it may be difficult to increase the agility in dynamic azimuth maneuvering of the pod because of limited available power and a high gear ratio involved in ring and pinion gear engagement in the azimuth control system.

In some examples, this architectural weakness of Z-drive and L-drive systems may make it rather unpractical to use a prime mover with a low rotational speed and high torque for driving the propeller shaft because a low speed/high torque prime mover would increase the burden of the azimuth control system. In some cases, a high speed and low torque prime mover may be preferred in which torque is usually amplified and the rotational speed is reduced accordingly inside the pod by a pair of bevel gears before it is applied to the propeller shaft. For example, a small bevel gear in diameter may be attached to the vertical shaft driven by the prime mover while a large bevel gear is used to drive the horizontal shaft connected to a propeller. This constraint may lead to a voluminous design of the pod in terms of the effective cross-sectional area of the pod normal to the thrust, tending to increase hydrodynamic drag caused by the pod.

In some examples, an electrical type prime mover is installed inside the pod to directly apply torque to the propeller, which may be under a risk of damaging the prime mover in an event of leakage. In this example, electrical power and various signals may be exchanged through a slip-ring which can cause frequent maintenance problems. In some cases, this architecture may require an independent azimuth control system to control the azimuth of the pod. In this case, it may be still difficult to achieve agile dynamic maneuvering of the pod azimuth because the moment of inertia of the whole pod assembly about the azimuthal axis can be large in comparison to the power available to the azimuth control system, due to the heavy prime mover installed inside the pod.

SUMMARY

An azimuth thruster system and its control methods are revealed in this disclosure in which the two primary prime movers fixed inside the hull of a vessel collaborate in controlling not only the angular speed of the propeller but also the azimuth of the pod, thereby the direction of the propeller thrust. In this system, there is no distinction between two primary prime movers in the roles of controlling the speed of the propeller and controlling the azimuth of the pod. The two primary prime movers are able to cooperatively deliver torques, each with an appropriate direction and magnitude, through two coaxially arranged shafts. The rotational motions of the two coaxially arranged shafts are mechanically synthesized inside the pod in a very energy efficient way to create both the rotational motion of the propeller and the azimuthal change of the pod with high degree of agility whenever necessary.

In this disclosure, the two primary prime movers, each with approximately half power capacity compared with conventional single prime mover system as in Z-drive or L-drive architectures, can provide the necessary power required for rotating both the propeller and the pod, wasting almost no energy and creating no internal stresses when maintaining constant azimuth of the pod. And since all necessary power can be supplied cooperatively by the two primary prime movers through two independent power transmission paths, the power capacity of the mechanical parts required in each path can be reduced as well by half in comparison to the conventional Z-drive or L-drive systems.

When only the propeller speed control is required without need to change the azimuth of the pod, which is often the case of straight cruising control of a ship, the torque applied to the propeller shaft is supplied in the form of pure moment or force couple by the two bevel gears symmetrically engaged at top and bottom with the bevel gear attached to the propeller shaft. This fact is beneficial to the propeller shaft and its supporting mechanical components because in this case any harmful bending moment exerted to the propeller shaft can be eliminated.

In some implementations, the azimuth thruster system may include an auxiliary third prime mover that can provide additional torque to change the azimuth of the pod. A mechanical architecture with the two primary prime movers and the auxiliary third prime mover can be used to build a fault-tolerant azimuth thruster system. For example, when one of the two primary prime movers is not controllable or inoperable, the other controllable primary prime mover and the auxiliary third prime mover can still continue to operate the azimuth thruster system, not in cooperative mode but in independent mode such that the controllable primary prime mover undertakes control of the speed of the propeller and the auxiliary third prime mover undertakes control of the azimuth of the pod.

According to one aspect of the subject matter described in this application, an azimuth thruster system for a vessel includes a pod configured to rotate relative to the vessel about an azimuthal axis of the pod, a propeller shaft that extends from the pod and that is configured to rotate relative to the pod about its central axis, an outer shaft that is disposed at least partially in the pod, that extends along the azimuthal axis of the pod, and that is configured to be driven by a first primary prime mover, an inner shaft that is disposed at least partially within the outer shaft, that extends along the azimuthal axis of the pod, and that is configured to be driven by a second primary prime mover, and a pod gear unit that is disposed within the pod and coupled to the outer shaft, the inner shaft, and the propeller shaft. The outer and inner shafts are configured to rotate at least one of the pod and the propeller shaft based on directions and magnitudes of a torque generated by the first and second primary prime movers.

Implementations according to this aspect may include one or more of the following features. For example, the pod gear unit may include a first bevel gear coupled to the outer shaft and configured to be rotated about the azimuthal axis of the pod by the outer shaft, a second bevel gear coupled to the inner shaft and configured to be rotated about the azimuthal axis of the pod by the inner shaft, and a joint bevel gear engaged with the first and second bevel gears and coupled to the propeller shaft. The joint bevel gear is configured, based on rotation of the first and second bevel gears, to (i) rotate the propeller shaft about the rotor axis or (ii) transfer force to the propeller shaft to rotate the pod about the azimuthal axis of the pod.

In some implementations, the pod may include a gear housing portion accommodating the pod gear unit and supporting the propeller shaft and a cylindrical portion extending from the gear housing portion and surrounding at least a portion of the outer shaft. The gear housing portion is configured to receive the force from the propeller shaft to rotate the pod about the azimuthal axis of the pod.

In some implementations, the system may further include two or more prime movers each configured to generate torque for driving both the pod and the propeller shaft in which the two or more prime movers includes the first primary prime mover and the second primary prime mover, a first transfer gear coupled to the first primary prime mover and configured to transfer a first torque generated from the first primary prime mover to the outer shaft, and a second transfer gear coupled to the second primary prime mover and configured to transfer a second torque from the second primary prime mover to the inner shaft. In some examples, the outer and inner shafts are coaxially arranged and configured to independently rotate about the azimuthal axis of the pod.

In some implementations, the two or more prime movers may include an auxiliary third prime mover that is coupled to the vessel or to the pod and that is configured to generate torque for driving the pod. In this case, the system may further include a drive train coupled to the auxiliary third prime mover, the drive train configured to transfer a torque generated from the auxiliary third prime mover to the pod for rotating the pod about the azimuthal axis of the pod. In some examples, the system may further include a fault-tolerant system that includes the first and second primary prime movers and the auxiliary third prime mover. The fault-tolerant system is configured, based on one of the first and second primary prime movers being inoperable, to dedicate the auxiliary third prime mover to drive the pod for azimuth control and maintain the other of the first and second primary prime movers to drive the propeller shaft.

In some implementations, the two or more prime movers may be configured, based on the first and second primary prime movers generating torque in a same direction to each other, to rotate the pod about the azimuthal axis relative to the vessel without causing rotation of the propeller shaft about the central axis. The two or more prime movers are further configured, based on the first and second primary prime movers generating torque in opposite directions to each other, to rotate the propeller shaft about the central axis without causing rotation of the pod about the azimuthal axis.

In some implementations, the system may further include a pulley unit that is located between the pod gear unit and the propeller shaft and that is configured to transfer rotational force from the pod gear unit to the propeller shaft. For example, the pulley unit includes at least one of a pulley, a belt, a sprocket, and a chain. In some implementations, the system may further include a plurality of propeller shafts and a plurality of propellers coupled to the plurality of propeller shafts, respectively. In some examples, the central axis of the propeller shaft is not squarely angled relative to the azimuthal axis of the pod.

In some implementations, the first transfer gear may include a plurality of gears engaged to each other and configured to translate the first torque to rotation of the outer shaft about the azimuthal axis, and the second transfer gear may include a plurality of gears engaged to each other and configured to translate the second torque to rotation of the inner shaft about the azimuthal axis.

According to another aspect of the subject matter, a method for controlling an azimuth thruster system, which includes a pod configured to rotate about an azimuthal axis of the pod, a propeller shaft coupled to the pod and configured to rotate about a rotor axis, two primary prime movers configured to generate power to cooperatively rotate the pod and the propeller shaft, includes determining current rotational speed of the propeller shaft, determining current azimuthal angle of the pod about the azimuthal axis, receiving a desired rotational speed of the propeller shaft, receiving a desired azimuthal angle of the pod about the azimuthal axis, determining a propeller speed difference or error value between the current rotational speed of the propeller shaft and the desired rotational speed of the propeller shaft, determining an azimuthal angle difference or error value between the current azimuthal angle of the pod and the desired azimuthal angle of the pod, determining a control command for each prime mover for simultaneously controlling both the rotational speed of the propeller shaft and the azimuthal angle of the pod based on the propeller speed difference value and the azimuthal angle difference value, and providing the control command to each prime mover.

Implementations according to this aspect may include one or more of the following features. For example, the method may further include determining a first torque reference command for a first primary prime mover of the two primary prime movers based on the propeller speed difference value and the azimuthal angle difference value, and determining a second torque reference command for a second primary prime mover of the two primary prime movers based on the propeller speed difference value and the azimuthal angle difference value. Determining the control command for each of the first and second primary prime movers includes determining the control command for each prime mover based on the first and second torque reference commands.

In some implementations, the method may further include determining a first rotational speed reference command for a first primary prime mover of the two primary prime movers based on the propeller speed difference value and the azimuthal angle difference value, determining a second rotational speed reference command for a second primary prime mover of the two primary prime movers based on the propeller speed difference value and the azimuthal angle difference value. Determining the control command for each of the first and secondary primary prime movers includes determining the control command for each prime mover based on the first and second rotational speed reference commands.

In some implementations, determining the first torque reference command may include determining the first torque reference command based on a linear combination of the propeller speed control command and the azimuthal angle control command, and determining the second torque reference command includes determining the second torque reference command based on a linear combination of the propeller speed control command and the azimuthal angle control command. For example, a linear combination of the speed control command and the angle control command may be summation or subtraction of the propeller speed command and the azimuthal angle control commands, which may be multiplied by a constant, respectively. In some examples, determining the first rotational speed reference command includes determining the first rotational speed reference command based on a linear combination of the propeller speed control command and the azimuthal angle control command, and determining the second rotational speed reference command includes determining the second rotational speed reference command based on a linear combination of the angle control command and the speed control command.

According to another aspect of the subject matter, an azimuth thruster system for a vessel includes a pod protruding from the vessel and configured to rotate about an azimuthal axis relative to the vessel, a propeller shaft extending from the pod and configured to rotate relative to the pod about a rotor axis, a first and second primary prime mover each configured to generate power for driving both the pod and the propeller shaft, an outer shaft that is disposed at least partially in the pod, that extends along the azimuthal axis of the pod, and that is configured to be driven by the first primary prime mover, and an inner shaft that is disposed at least partially in the outer shaft, that extends along the azimuthal axis of the pod, and that is configured to be driven by the second primary prime mover.

The system further includes a pod gear unit disposed within the pod, the pod gear unit rotatably coupled to the outer shaft, the inner shaft, and the propeller shaft, a first transfer gear coupled to the first primary prime mover and configured to translate first torque generated from the first primary prime mover to rotation of the outer shaft, a second transfer gear coupled to the second primary prime mover and configured to translate second torque from the second primary prime mover to rotation of the inner shaft, an azimuth sensor configured to measure an azimuthal angle of the pod relative to the vessel, an angular speed sensor configured to measure a rotational speed of the propeller shaft, and a controller configured to control the first and second primary prime movers to cause at least one of rotation of the pod about the azimuthal axis relative to the vessel and rotation of the propeller shaft about the rotor axis based on the measured azimuthal angle of the pod and rotational speed of the propeller shaft.

Implementations according to this aspect may include one or more of the following features. For example, the controller may be further configured to control the first and second primary prime movers to cause rotation of the pod about the azimuthal axis while restricting rotation of the propeller shaft. In some examples, the controller may be further configured to control the first and second primary prime movers to cause rotation of the propeller shaft while restricting rotation of the pod about the azimuthal axis.

DETAILED DESCRIPTION

I. Azimuth Thruster System

Figure 1:
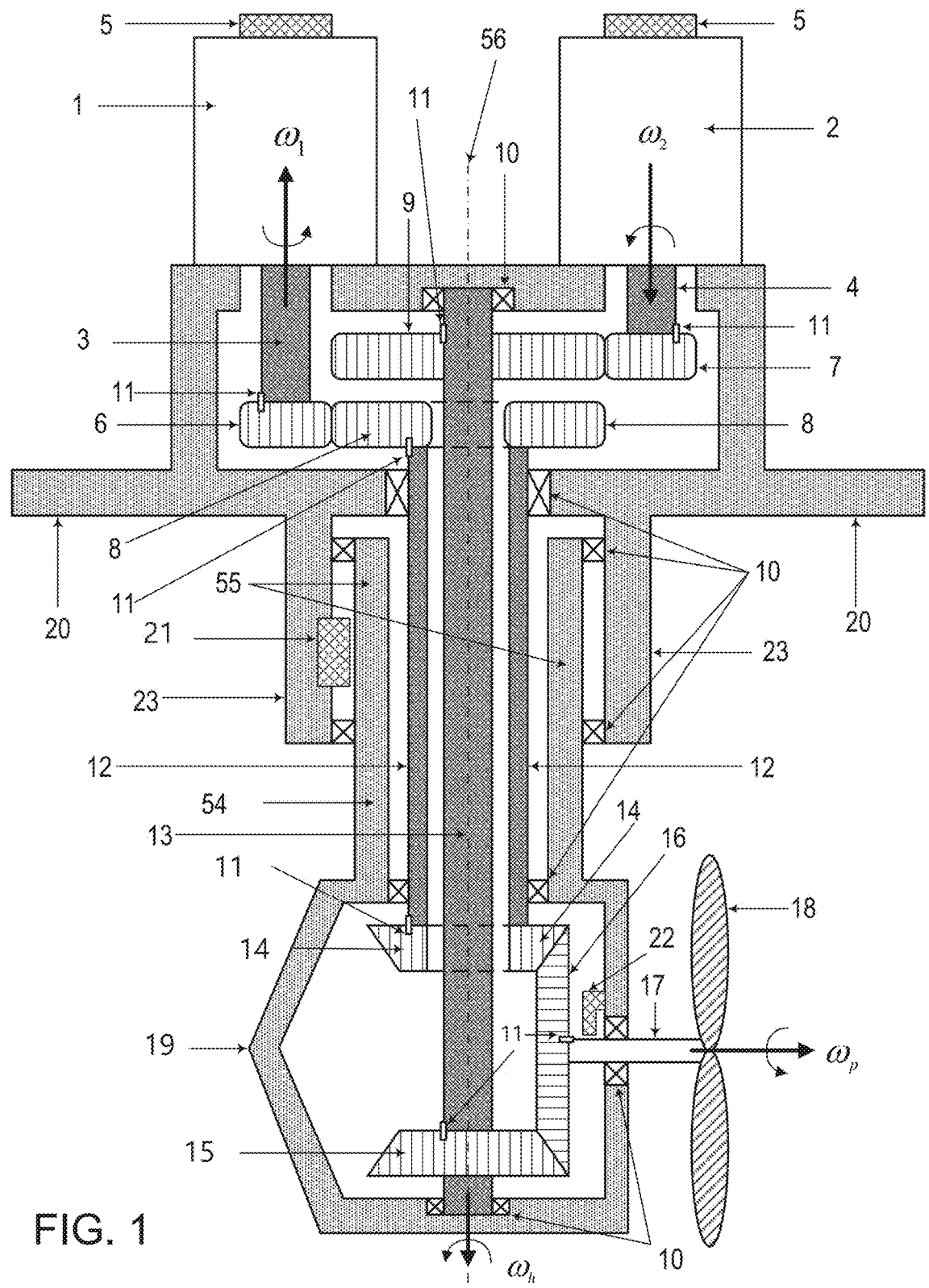
FIG. 1 is a cross-sectional view showing a conceptual architecture of an example azimuth thruster system including a propeller and a pod that are cooperatively driven through coaxial shafts and bevel gears by two primary prime movers fixed at a hull.

FIG. 1 illustrates an example azimuth thruster system of a vessel that includes first and second primary prime movers 1 and 2 located at a platform 20 of the vessel, an outer shaft 12 coupled to the first primary prime mover 1 via first transfer gears 6 and 8, and an inner shaft 13 coupled to the second primary prime mover 2 via second transfer gears 7 and 9. The platform 20 may define a hull of the vessel and a pod 54 may protrude downward from the hull to be immersed in water. The outer shaft 12 and the inner shaft 13 are coaxially arranged in the pod 54.

The pod 54 includes a pod gear unit including bevel gears 14, 15, and 16 to transfer the torque from the outer and inner shafts 12 and 13 to drive the propeller shaft 17 and the pod 54. The pod 54 includes a gear housing portion 19 that accommodates the pod gear unit including bevel gears 14, 15, and 16 and supports the propeller shaft 17. The pod 54 includes a cylindrical portion 55 that extends from the gear housing portion 19 towards the hull of the vessel and surrounds at least a portion of the outer shaft 12. The gear housing portion 19 is configured to receive the force from the propeller shaft 17 to thereby rotate the pod 54 about an azimuthal axis 56 of the cylindrical portion 55 of the pod 54.

By controlling directions and magnitudes of a first torque from the first primary prime mover 1 and a second torque from the second primary prime mover 2, the pod 54 and the propeller shaft 17 may be rotated independently. For example, the pod 54 may rotate about an azimuthal axis 56 of the pod 54 relative to the platform 20 while the propeller shaft 17 does not rotate about its central axis transverse to the azimuthal axis 56 of the pod 54. In this case, the torques of the outer and inner shaft 12 and 13 are transferred to the pod 54 and generate a moment that causes rotation of the pod about the azimuthal axis 56 of the pod 54 relative to the platform 20. The gear housing portion 19 of the pod 54 may receive the moment through the propeller shaft 17 and bearing 10 and rotate the pod 54 about the azimuthal axis 56 of the pod 54 relative to the platform 20.

In some cases, the propeller shaft 17 may rotate about the rotor axis while the pod 54 does not rotate about the azimuthal axis 56 relative to the platform 20. In other cases, the propeller shaft 17 may rotate about the rotor axis while the pod 54 rotates about the azimuthal axis 56 relative to the platform 20.

Referring to FIG. 1, the basic operation principle of the azimuth thruster system can be described as follows. In the following description, it is assumed that any relative rotations between two adjacent mechanical bodies are supported by the bearings 10. To simplify the explanation of the principle of operation of the system, suppose first that the pod 54 is not rotating and rotational force is applied to the propeller 18 from outside. In this case, the rotational motion of propeller 18 relative to the pod 54 is transmitted to the horizontally installed bevel gear 16 through the shaft 17. The rotational motion transmitted to bevel gear 16 in turn induces rotational motions of two vertically installed bevel gears 14 on the top and 15 at the bottom, in which the directions of rotational motions of two vertically installed bevel gears 14 and 15 are opposite to each other, for example, the two bevel gears 14 and 15 are counter-rotating in this situation.

Now, assume that there exists rotational motion of the pod 54 relative to the platform 20 and 23 about the axis of coaxial shafts 12 and 13 or about the azimuthal axis 56 of a cylindrical portion of the pod 54, but without any rotation of propeller 18 and the propeller shaft 17 relative to the pod 54. In this case, the two vertically arranged bevel gears 14 and 15 rotate with the pod 54. In other words, in this case, the two bevel gears 14 and 15 rotate with the same rotational speed and direction that the pod 54 is experiencing.

Finally, assume that the rotational motion of propeller 18 relative to the pod 54 and the rotational motion of the pod 54 are caused simultaneously. Then, the two bevel gears 14 and 15 create rotational motions corresponding to the combined rotational motion of the propeller 18 relative to the pod 54 and the rotational motion of the pod 54 itself.

The rotational motions of the two bevel gears 14 and 15 are mechanically coupled to the rotational motions of two primary prime movers 1 and 2 fixed on the platform 20. In other words, the rotational motion of primary prime mover 1 is transferred to the bevel gear 14 sequentially through the shaft 3, the transfer gears 6 and 8, and the hollow outer shaft 12. On the other hand, the rotational motion of primary prime mover 2 is delivered to the bevel gear 15 sequentially through the shaft 4, the transfer gear 7 and 9, and the shaft 13. Keys 11 may be installed to couple the various gears (e.g., gears 6, 7, 8, 9, 14, 15, and 16) to their respective shafts.

Since the mechanical power is transmitted from the two primary prime movers to the propeller and to the pod through two independent paths, it may be possible to reduce the drive train capacity of each path by half, for instance, in comparison to conventional Z- or L-structure. The size of required gears may be reduced as well.

To understand the behavior of the mechanism quantitatively, the speed relationship governing the operations of the azimuth thruster system can be derived, by assuming to simplify the explanation that two primary prime movers are configured symmetrically in mechanical gain (e.g., a gear ratio) point of view, as $$\omega_1 = a \cdot \omega_p + b \cdot \omega_h \qquad <1>$$

$$\omega_2 = a \cdot \omega_p - b \cdot \omega_h \qquad <2>$$

where $\omega_p$ and $\omega_h$ denote the rotational speed of the propeller shaft 17 relative to the pod 54 and the rotational speed of the pod 54 about an azimuthal axis 56 relative to the hull, respectively, while $\omega_1$ and $\omega_2$ represent respectively the rotational speed of the primary prime movers 1 and 2, and a and b are two positive constants determined by the gear ratio involved in motion transmission path. Note that if the symmetricity assumption is not met, then there may be in general four constants involved in Eqns. <1> and <2>, determined by the gear ratio involved in motion transmission path.

The sign convention for a positive direction of rotational velocity is depicted in FIG. 1 by the thick arrow lines at the two primary prime movers following the right hand rule. For example, when the four right hand fingers other than the thumb curl around the arrow shaft, the thumb indicates the positive direction of rotation coinciding with the arrow head. In view of Eqns. <1> and <2>, it can be found that the rotational speeds of the primary prime movers 1 and 2 are proportional to the rotational speed of propeller shaft 17 but with the same sign, while being proportional to the rotational speed of the pod with the opposite sign. The inverse speed relationships of Eqns. <1> and <2> may be obtained as $$\omega_p = \frac{\omega_1}{2a} + \frac{\omega_2}{2a} \qquad <3>$$

$$\omega_h = \frac{\omega_1}{2b} - \frac{\omega_2}{2b} \qquad <4>$$

Notice in Eqns. <3> and <4> that if two constants a and b are designed appropriately, both $\omega_p$ and $\omega_h$ can be generated with enough agility required for the specific application of azimuth thruster. Equations <3> and <4> indicate that when the two primary prime movers are controlled such that $$\omega_1 = -\omega_2, \quad <5>$$

a pure azimuthal change of the pod about an azimuthal axis 56 can be produced without generating any rotational motion of the propeller, i.e., $\omega_p=0$, and that when the two primary prime movers are controlled such that $$\omega_1 = \omega_2 \quad <6>$$

a pure rotational motion of the propeller can be obtained without changing the azimuth of the pod, i.e., $\omega_h=0$. The latter case implies the possibility that all the power from the two primary prime movers may be utilized only in rotating the propeller with no power being wasted for maintaining constant azimuth of the pod, thereby eliminating the critical weakness of conventional Z-drive or L-drive systems.

The torque relationship dual to the speed relationship Eqn. <1> and <2> can be derived by assuming no loss of power along power transmission path as $$\tau_p = a\tau_1 + a\tau_2 \quad <7>$$

$$\tau_h = b\tau_1 - b\tau_2 \quad <8>$$

and the inverse torque relationships as $$\tau_1 = \frac{\tau_p}{2a} + \frac{\tau_h}{2b} \quad <9>$$

$$\tau_2 = \frac{\tau_p}{2a} - \frac{\tau_h}{2b} \quad <10>$$

where $\tau_p$ and $\tau_h$ denote the torque transmitted through the propeller shaft 17 and the torque applied on the pod 54, respectively, and $\tau_1$ and $\tau_2$ represent the torques transmitted through the shafts 3 and 4 by the primary prime movers 1 and 2, respectively. The sign convention for the torques follows the same rule for the angular velocities defined previously.

II. Control of the System

There may exist many diverse ways of designing a controller for the disclosed azimuth thruster system. Two illustrative controllers are described from viewpoints of torque control and speed control in order to demonstrate how the speed and torque relationships and their inverse relationships may be utilized in the design of controllers.

Suppose there are errors both in the azimuth of the pod and in the rotational speed of the propeller. The azimuth error may be an angle difference value between a measured azimuthal angle and a desired azimuthal angle. The rotational speed error may be a speed difference value between a measured rotational speed and a desired rotational speed. Then, a proportional-integral-derivative (PID) torque controller that generates required reference torque commands for the two primary prime movers can be designed as follows. The azimuth of the pod, $\theta_h$, can be measured either directly by using the sensor 21 that measures azimuth of the pod 54 relative to the hull or platform 20, or indirectly by integrating the inverse speed relationship Eqn. <4> using the speed sensors 5 mounted on the primary prime movers. Hence the azimuth error $\Delta\theta$ of the pod can be found as $$\Delta\theta = \theta_d - \theta_h \quad <11>$$

$$= \theta_d - \frac{1}{2b}\int_{t=0}^{t}(\omega_1 - \omega_2)dt - \theta_0$$

where $\theta_d$ is the desired azimuth of the pod and $\theta_0$ denotes the initial azimuth of the pod at $t=0$. Similarly, the error $\Delta\omega$ involved in the propeller rotational speed may be obtained as follows. The current rotational speed of the propeller $\omega_p$ can be either directly measured by the sensor 22 that measures the rotational speed of the shaft 17 relative to the pod 54, or obtained by the inverse speed relationship Eqn. <3>. Hence, the error $\Delta\omega$ can be expressed as $$\Delta\omega = \omega_d - \omega_p \quad <12>$$

$$= \omega_d - \frac{1}{2a}(\omega_1 + \omega_2)$$

where $\omega_d$ denotes the desired rotational speed of the propeller.

Then, the torque required for azimuth control $\tau_{hc}$ can be expressed in PID proportional integral derivative form as $$\tau_{hc} = K_{hp}\Delta\theta + K_{hi}\int_{\tau=0}^{t}\Delta\theta d\tau + K_{hd}\frac{d}{dt}(\Delta\theta) \quad <13>$$

where $K_{hp}$, $K_{hi}$, and $K_{hd}$ respectively denote proportional, integral, and derivative gain of the azimuth controller. Similarly, PID controller for the propeller rotational speed control can be obtained as $$\tau_{pc} = K_{pp}\Delta\omega + K_{pi}\int_{\tau=0}^{t}\Delta\omega d\tau + K_{pd}\frac{d}{dt}(\Delta\omega) \quad <14>$$

where $\tau_{pc}$ is the required control torque and $K_{pp}$, $K_{pi}$, and $K_{pd}$ respectively denote proportional, integral, and derivative gain of the speed controller.

Finally, the corresponding torques $\tau_{1c}$ and $\tau_{2c}$ for each prime mover are found from the inverse torque relationships Eqns. <9> and <10> as $$\tau_{1c} = \frac{\tau_{pc}}{2a} + \frac{\tau_{hc}}{2b} \quad <15>$$

$$\tau_{2c} = \frac{\tau_{pc}}{2a} - \frac{\tau_{hc}}{2b} \quad <16>$$

Figure 2A:
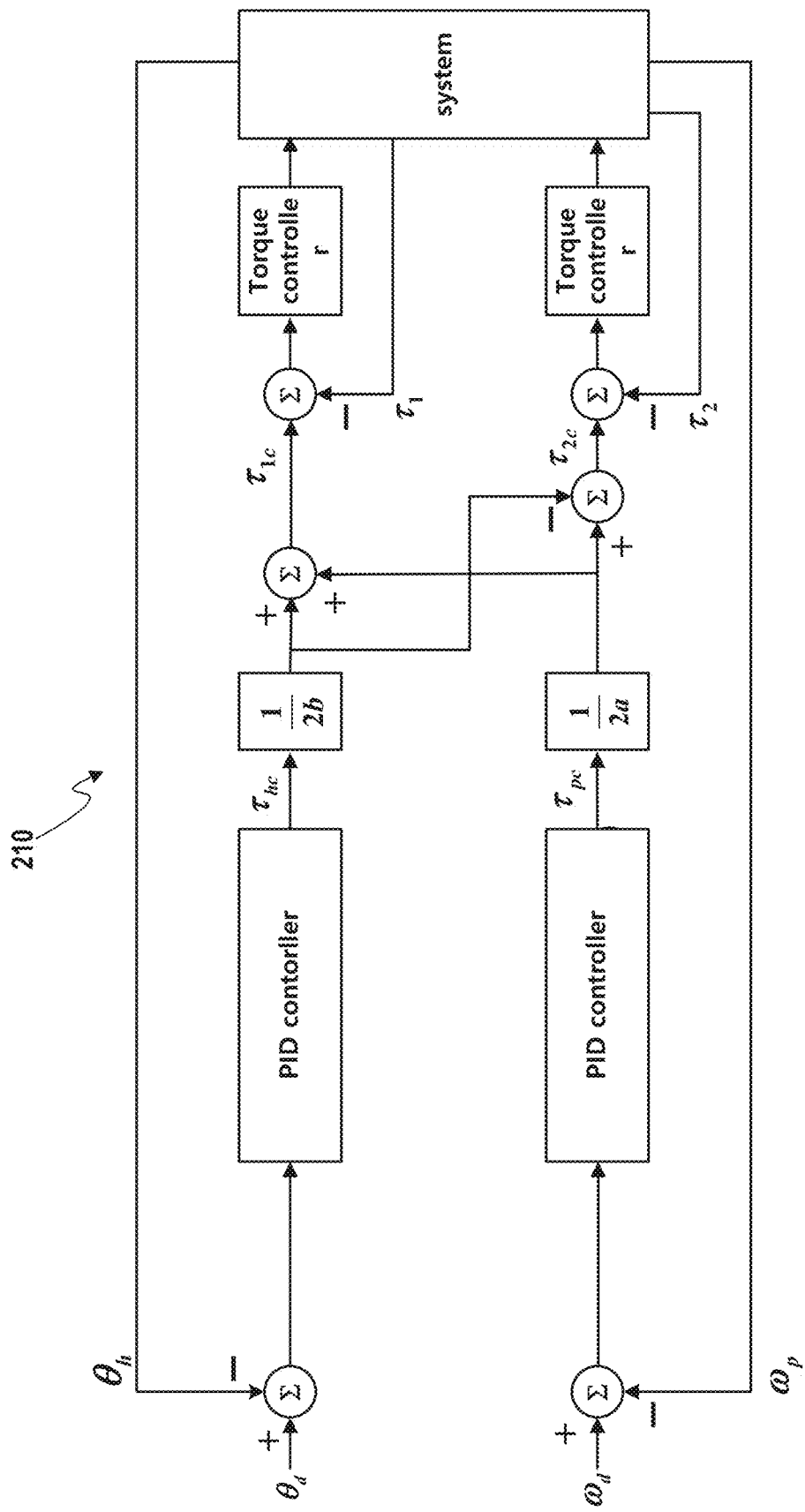
FIG. 2A is a control block diagram showing an example torque controller for the azimuth thruster system of FIG. 1.
Figure 2B:
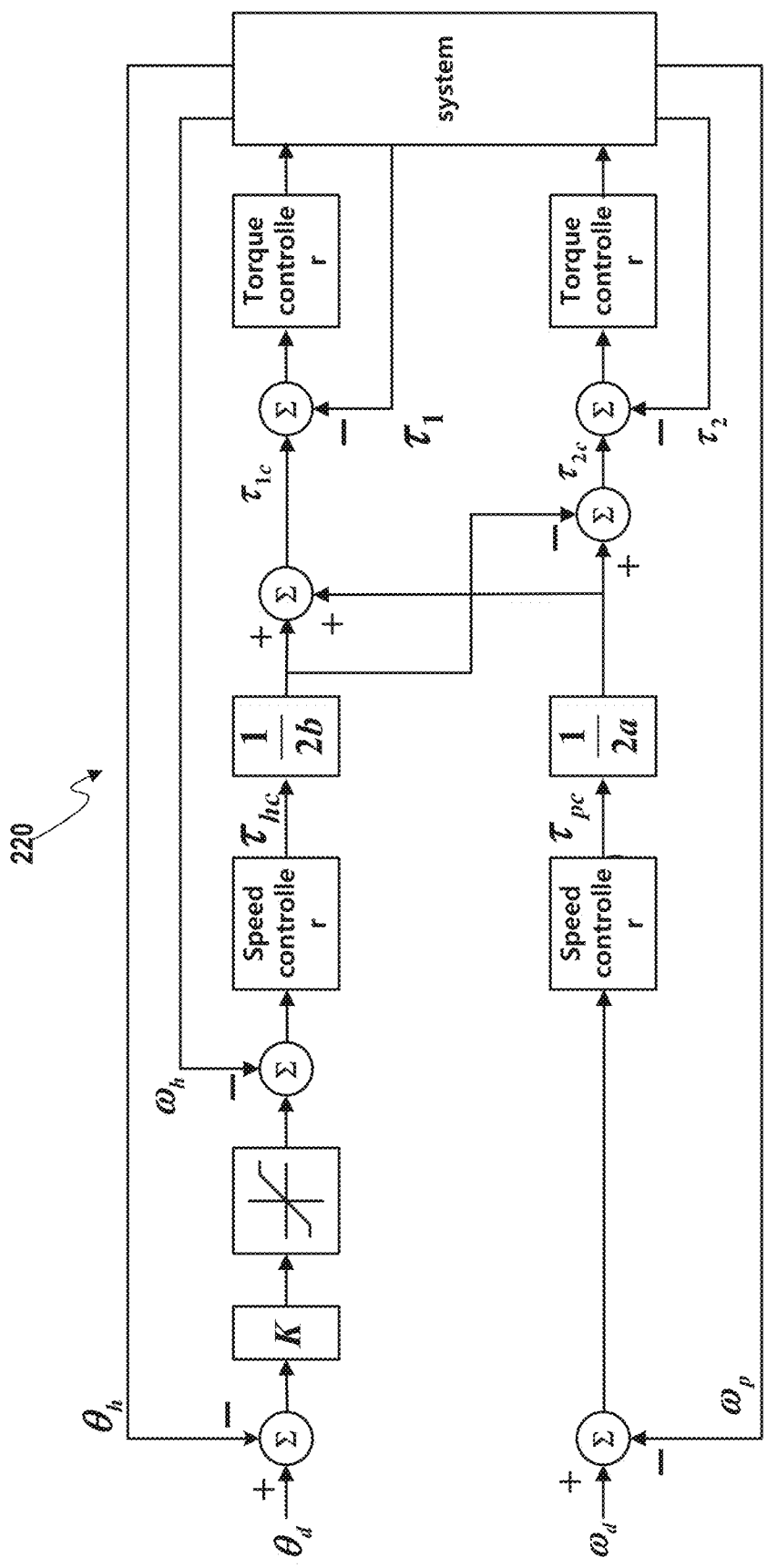
FIG. 2B is a control block diagram showing an example torque controller for the azimuth thruster system of FIG. 1, the torque controller including a saturation block for rotational speed of the pod.

The torques $\tau_{1c}$ and $\tau_{2c}$ and given in Eqns. <15> and <16>, respectively, are the torque commands which should be referenced respectively by some torque controller for the two primary prime movers and how to design the torque controllers for the primary prime movers depends on the types of prime movers actually utilized, which is not delineated further here. FIG. 2A shows the controller 210 which depicts the structure of the controller just described. A modified controller 220 shown in FIG. 2B can monitor the rotational speed of the pod 54 and saturate it if necessary for the safe operation.

Figure 3:
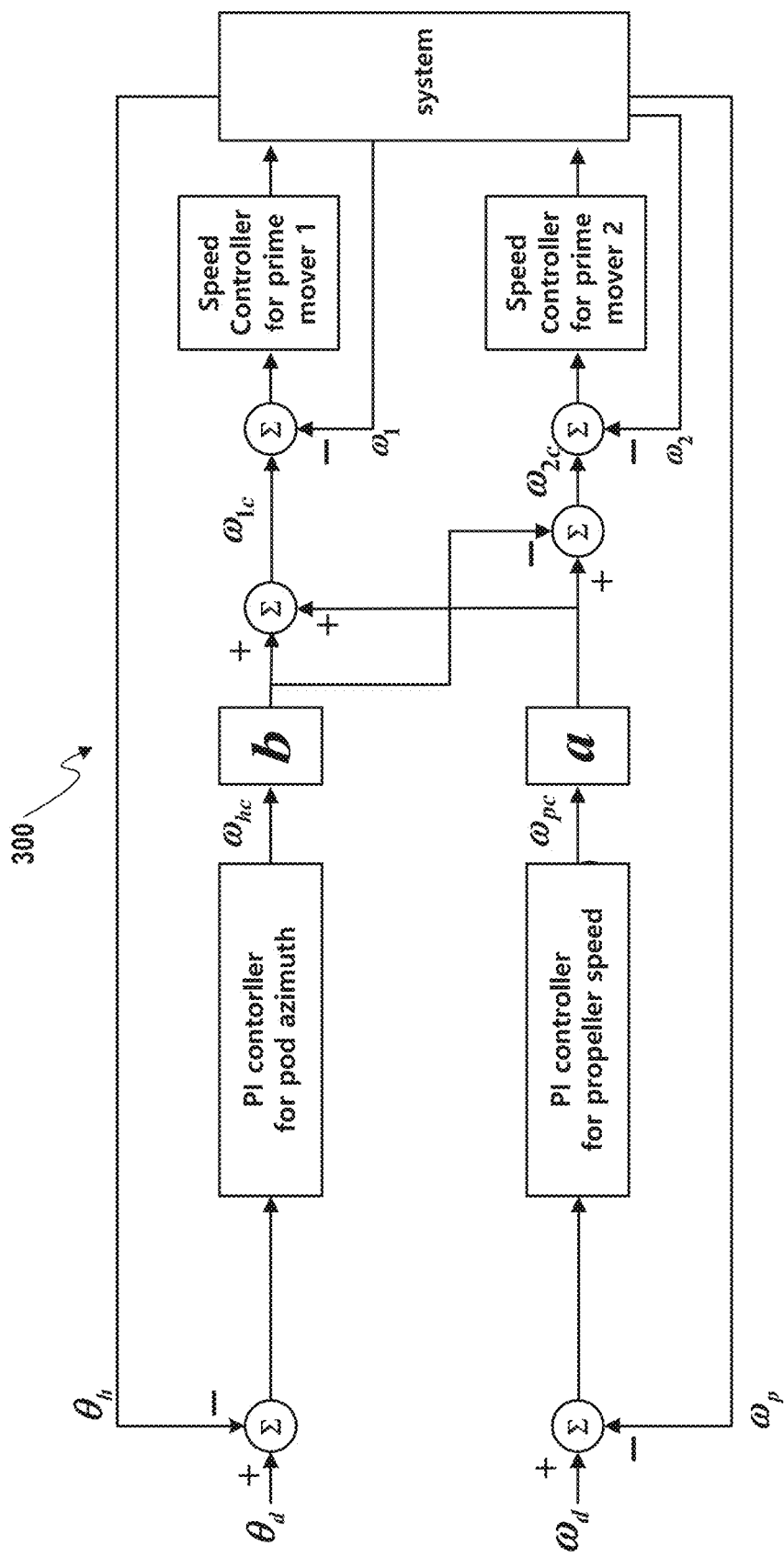
FIG. 3 is a control block diagram showing an example velocity controller for the azimuth thruster system of FIG. 1.

Now, suppose the errors involved in the azimuth of the pod and in the rotational speed of the propeller are obtained as in Eqns. <11> and <12>, respectively. Then the required speed command for the two primary prime movers can be obtained as follows. Firstly, a speed control action $\omega_{hc}$ of proportional-integral (PI) type to reduce the azimuthal error of the pod is formed as $$\omega_{hc} = K'_{hp}\Delta\theta + K'_{hi}\int_{\tau=0}^{t}\Delta\theta d\tau \qquad <17>$$

where $K'_{hp}$ and $K'_{hi}$ are the proportional and integral gains, respectively. Similarly, a speed control action $\omega_{pc}$ of PI type that can eliminate the error involved in the speed of the propeller is constructed as $$\omega_{pc} = K'_{pp}\Delta\omega + K'_{pi}\int_{\tau=0}^{t}\Delta\omega d\tau \qquad <18>$$

where $K'_{pp}$ and $K'_{pi}$ and are the proportional and integral gains, respectively. Note that $\omega_{hc}$ and $\omega_{pc}$ defined respectively in Eqns. <17> and <18> are the control actions which are generated cooperatively by the two primary prime movers. Hence the necessary inputs to the speed controllers for the two primary prime movers are determined from the speed relationship given in Eqns. <1> and <2> as $$\omega_{1c} = a\cdot\omega_{pc} + b\cdot\omega_{hc} \qquad <19>$$

$$\omega_{2c} = a\cdot\omega_{pc} - b\cdot\omega_{hc} \qquad <20>$$

where $\omega_{1c}$ and $\omega_{2c}$ are the speed commands that should be referenced respectively by the appropriate speed controllers for the two primary prime movers. FIG. 3 shows the structure of the controller 300 where two speeds given in Eqns. <19> and <20> are referenced by speed controllers for the primary prime movers.

III. Architectural Variations of the Proposed System

Figure 4:
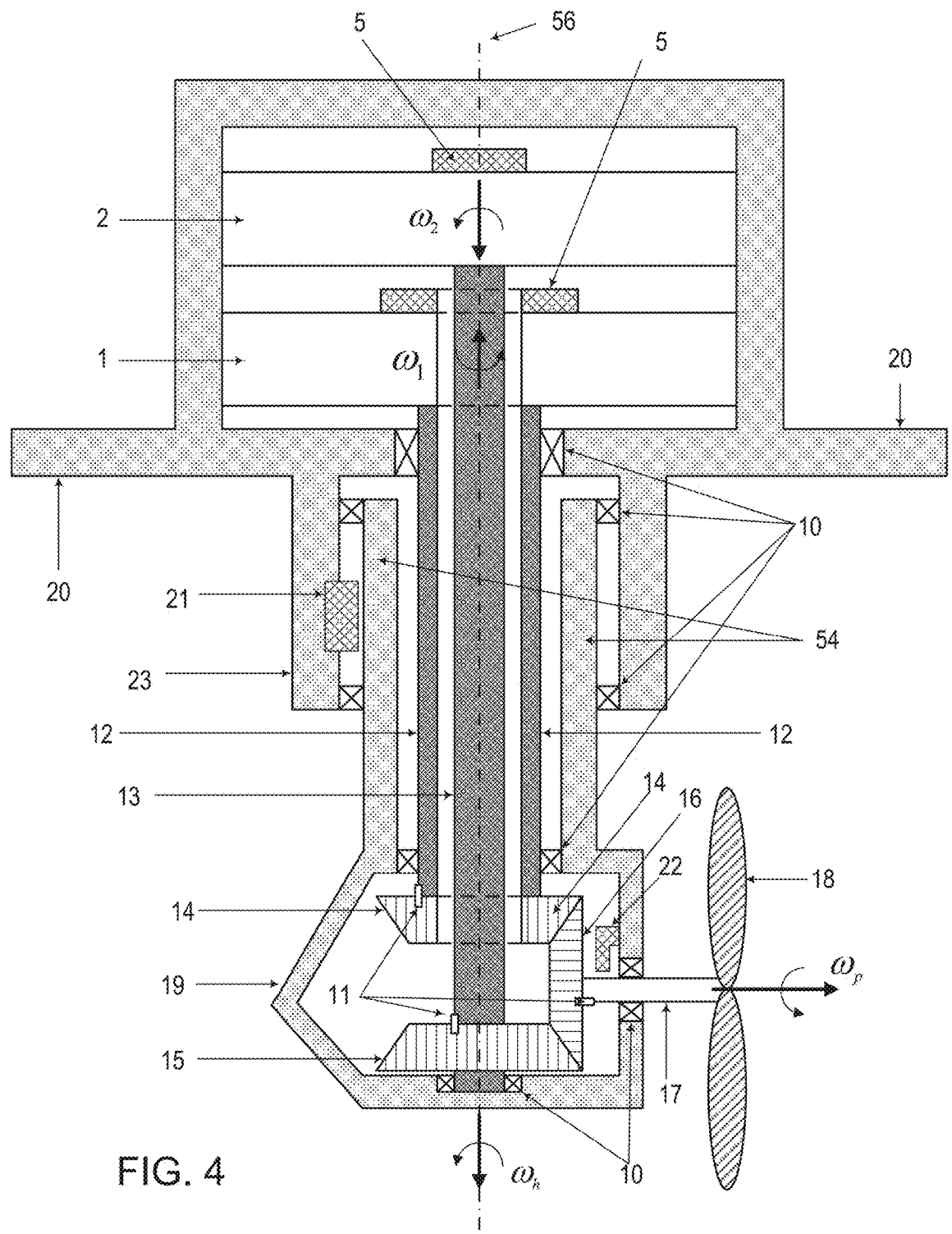
FIG. 4 is a cross-sectional view showing an example azimuth thruster system with two layered prime movers coupled to coaxial shafts.

FIG. 4 shows an implementation where two primary prime movers 1 and 2, arranged vertically along an azimuthal axis 56 in layered form, are directly connected to the coaxial shafts 12 and 13, respectively. The prime mover 1 has an annular structure and uses a hollow shaft 12 such that the shaft 13 can be connected through to the primary prime mover 2. The speed sensors 5 can be mounted on the primary prime movers. This architecture may be suitable when a high torque prime mover which is generally large in diameter is used. In this case, since a pair of bevel gears with low gear ratio can be used inside the gear housing 19, the volume and cross sectional area of the gear housing 19 can be minimized to reduce hydrodynamic drag caused by the pod 54.

Figure 5:
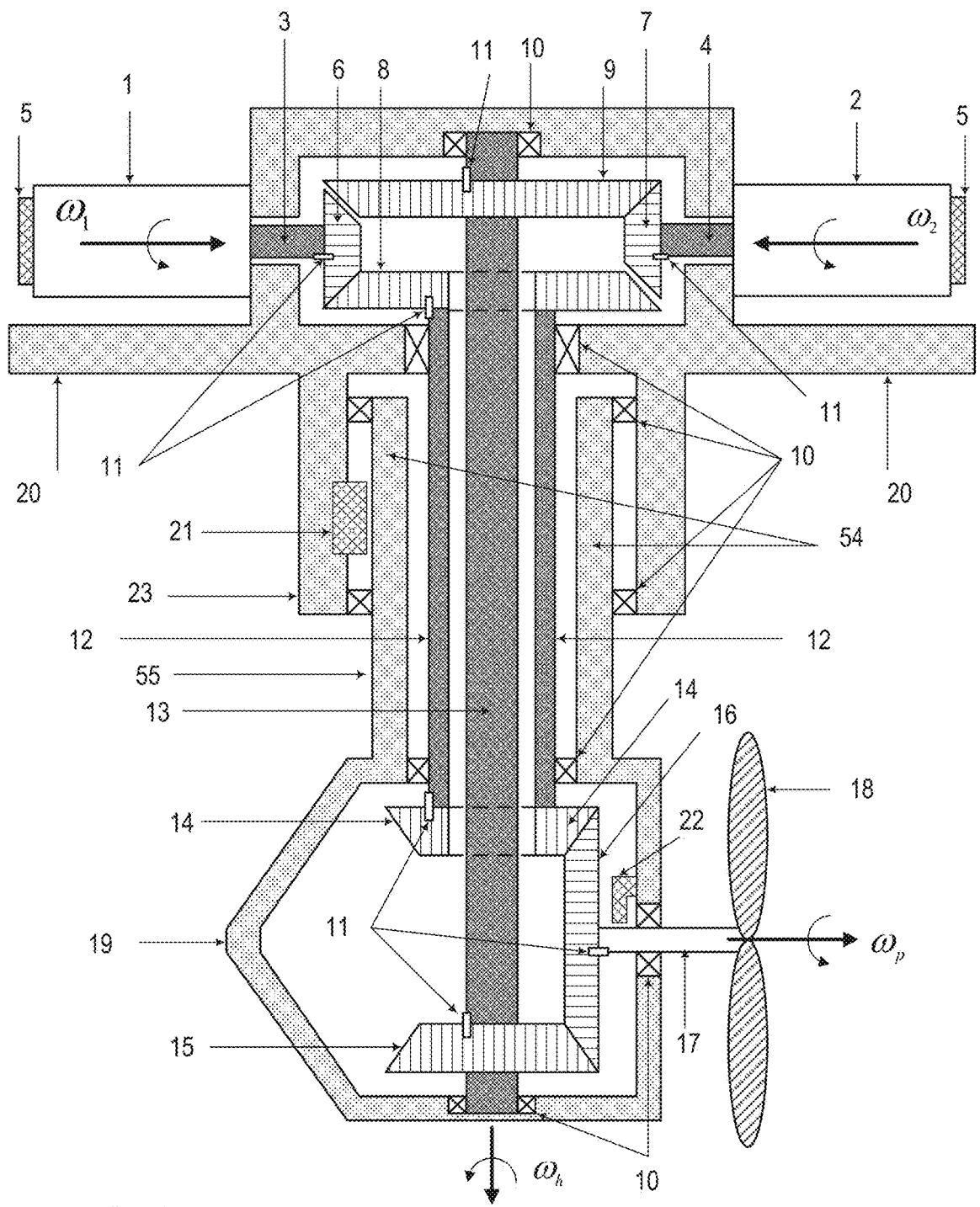
FIG. 5 is a cross-sectional view showing an example azimuth thruster system with two primary prime movers mounted horizontally.

FIG. 5 shows an implementation where the two primary prime movers 1 and 2 are mounted horizontally on the hull or platform 20 and connected to the vertical coaxial shafts 12 and 13 through transfer gears 6, 7, 8, and 9 which are bevel gears in this example. For instance, torque generated from the first primary prime mover 1 is transferred to the transfer gears 6 and 8, and torque generated from the second primary prime mover 2 is transferred to the transfer gears 7 and 9. Based on the arrangement of the transfer gears 6, 7, 8, and 9, the torque are initially delivered horizontally along the axes of primary prime movers 1 and 2 and then redirected vertically along the azimuthal axis of the pod 54.

Figure 6:
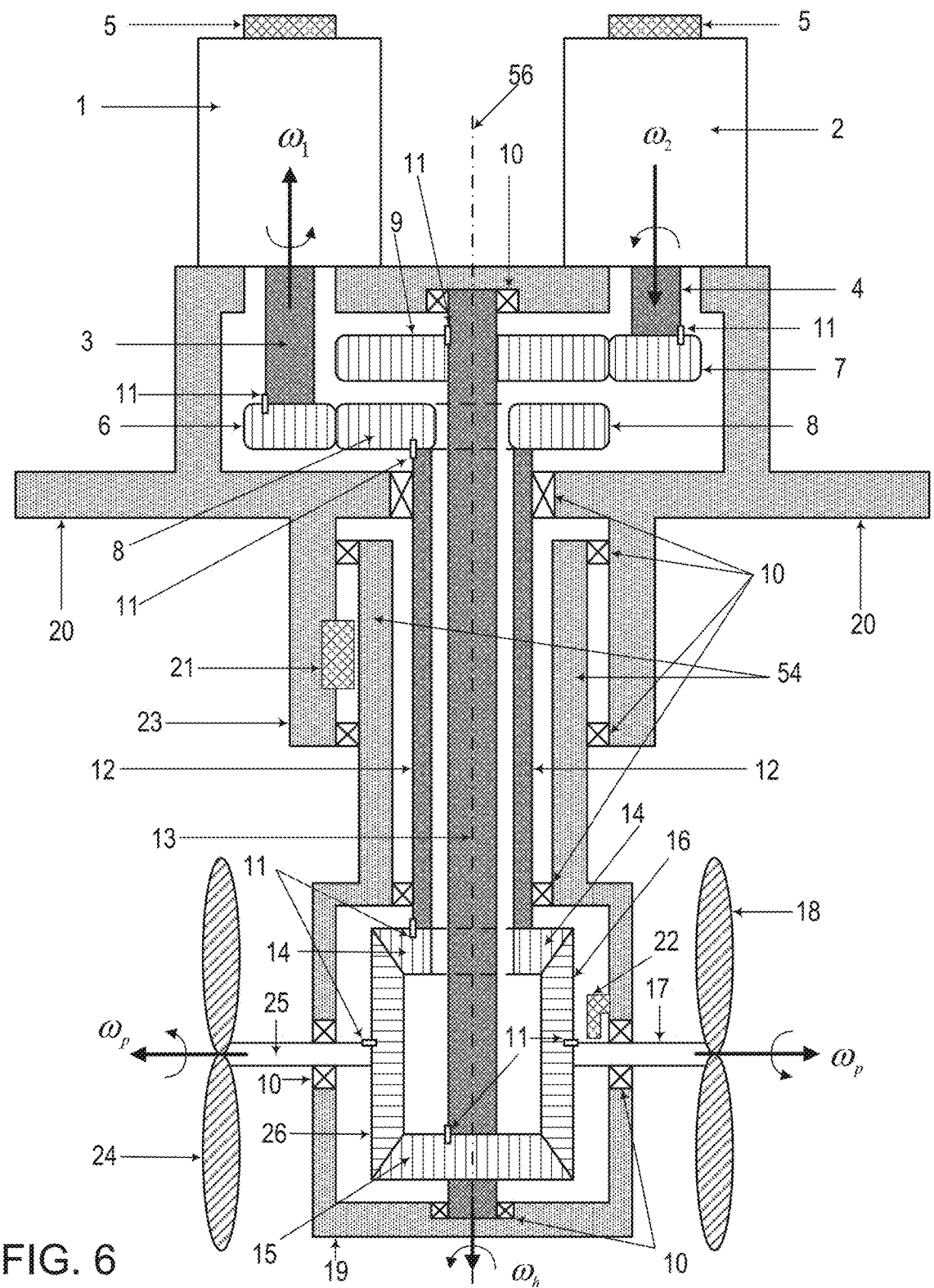
FIG. 6 is a cross-sectional view showing an example azimuth thruster system with two connected counter-rotating propellers with a reverse pitch to increase thrusting efficiency.

FIG. 6 shows an implementation where two propellers 18 and 24 with relatively reverse pitches are utilized to increase the thrusting efficiency by minimizing the circular wakes, while reducing the noise cause by the propeller. In this example, the system includes two propeller shafts 17 and 25, two propellers 18 and 24 coupled to the propeller shafts 17 and 25, respectively, a first bevel gear 14 coupled to the outer shaft 12, a second bevel gear 15 coupled to the inner shaft 13, and two joint bevel gears 16 and 26 engaged with both of the first and second bevel gears 14 and 15. The two primary prime movers 1 and 2 may be controlled to cooperatively rotate the two propellers 18 and 24 about rotor axis of the propeller shafts 17 and 25 as well as rotate the pod about the azimuthal axis 56 of the pod relative to the platform 20.

Figure 7:
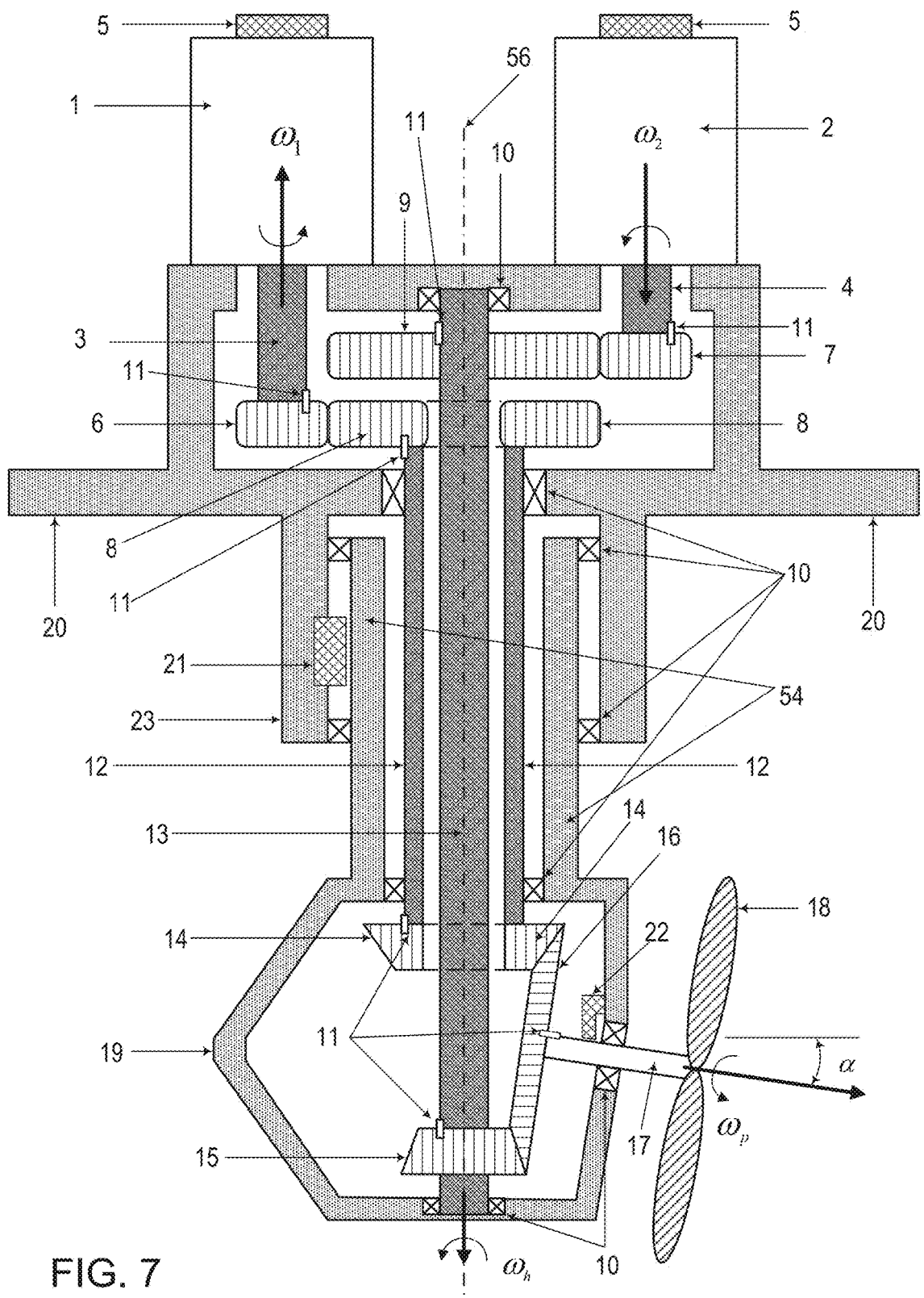
FIG. 7 is a cross-sectional view showing an example azimuth thruster system with an oblique arrangement of a propeller shaft.

FIG. 7 shows the implementation of a thruster system in which the central axis of the propeller shaft is not squarely angled relative to the azimuthal axis 56 of the pod 54. In some implementations, in order to increase the efficiency of the propeller thrust, it may be desired to direct the thrust not horizontally but obliquely so that the wake interference with other structure of the vessel itself can be avoided.

For example, the propeller axis may be inclined downward by a predetermined angle α from the horizontal. In this case, the speed relationships among the four speeds (i.e., the propeller speed $\omega_p$ relative to the pod, the rotational speed of the pod $\omega_h$ about an azimuthal axis 56 relative to the hull, and the rotational speeds of two primary prime movers $\omega_1$ and $\omega_2$) can be written as $$\omega_1 = a\cdot\omega_p + b\cdot\omega_h \qquad <21>$$

$$\omega_2 = c\cdot\omega_p - b\cdot\omega_h \qquad <22>$$

where a, b, and c are positive constants determined by the gear ratio involved in the drive train. The torque relationships among the four torques that is dual to the speed relationships given in Eqns. <21> and <22> can be found similarly as $$\tau_p = a\tau_1 + c\tau_2 \qquad <23>$$

$$\tau_h = b\tau_1 - b\tau_2 \qquad <24>$$

And the inverse torque relationship can be expressed as $$\tau_1 = \frac{1}{ab+bc}(b\cdot\tau_p + c\cdot\tau_h) \qquad <25>$$

$$\tau_2 = \frac{1}{ab+bc}(b\cdot\tau_p - a\cdot\tau_h) \qquad <26>$$

In this architecture, it should be noted that the vertical component of the propeller torque $\tau_p$ acts as a disturbing torque to the azimuth controller of the pod. In order to compensate this torque, an extra torque should be applied to the azimuth controller of the pod as $$\tau_h = -\tau_p \sin\alpha \qquad <27>$$

And the required torque for the azimuth control, therefore, should be modified as $$\tau_{hc}^m = \tau_{hc} - \tau_{pc} \sin\alpha \qquad <28>$$

where $\tau_{hc}^m$ denotes the modified control torque for azimuth control, and $\tau_{hc}$ and $\tau_{pc}$ are previously defined in Eqns. <13> and <14>, respectively. Accordingly, the required torques $\tau_{1c}$ and $\tau_{2c}$ for each prime mover are modified in view of Eqns. <25> and <26> as $$\tau_{1c} = \frac{1}{ab+bc}(b \cdot \tau_{pc} + c \cdot \tau_{hc}^m) \qquad <29>$$

$$\tau_{2c} = \frac{1}{ab+bc}(b \cdot \tau_{pc} - a \cdot \tau_{hc}^m) \qquad <30>$$

Figure 8:
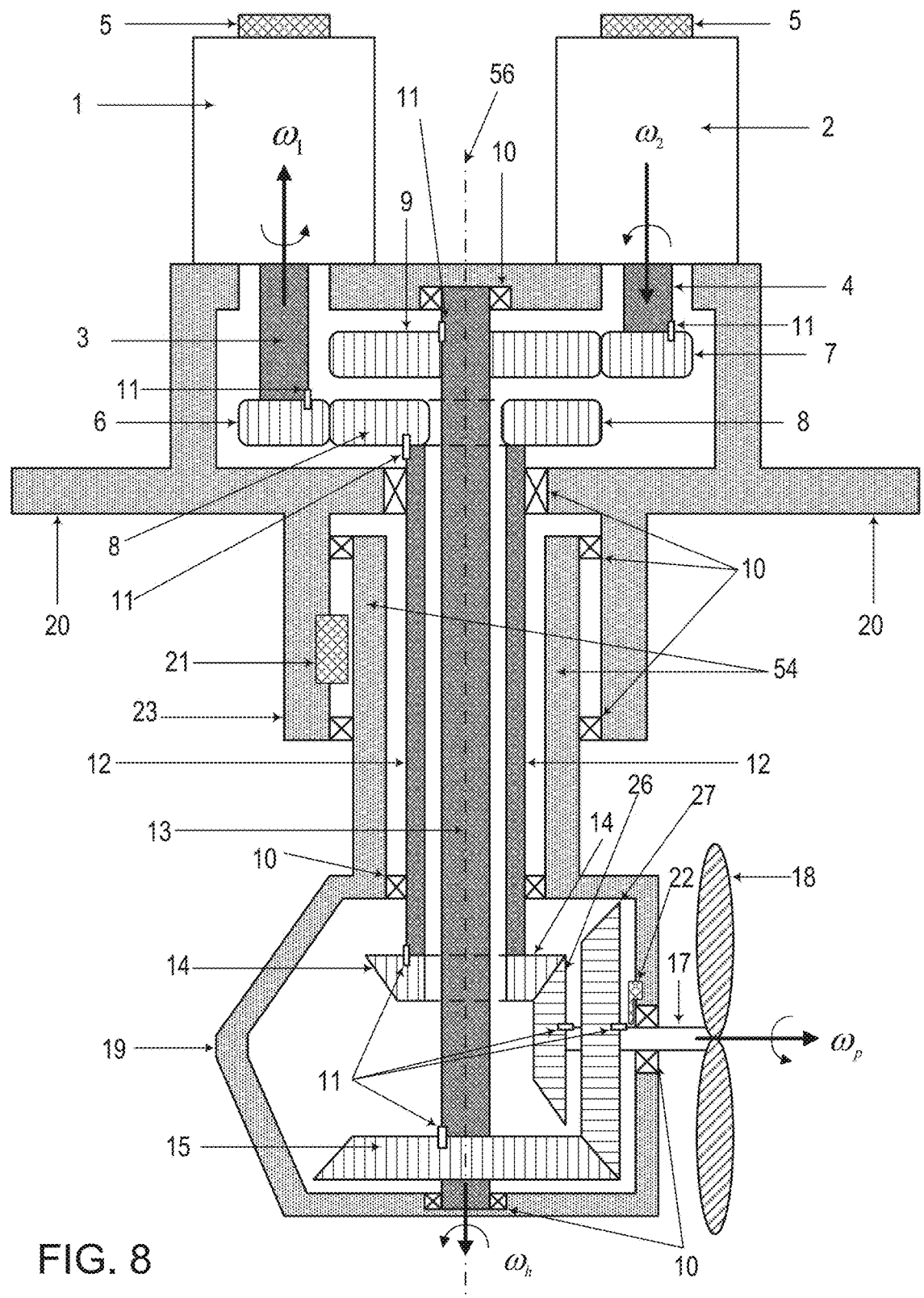
FIG. 8 is a cross-sectional view showing an example azimuth thruster system with two pairs of bevel gears to combine power from two primary prime movers.

FIG. 8 depicts an example of using two pairs of bevel gears 14 and 26, and 15 and 27 to combine the power delivered from two primary prime movers. For instance, first power from the first primary prime mover 1 is transferred to the propeller shaft 17 through the outer shaft 12 and the first pair of bevel gears 14 and 26. Similarly, second power from the second primary prime mover 2 is transferred to the propeller shaft 17 through the inner shaft 13 and the second pair of bevel gears 15 and 27. Depending on directions and magnitudes of the first and second torques, the pod 19 and the propeller shaft 17 may be rotated independently. For example, the pod 19 may rotate about the azimuthal axis 56 of the pod 19 relative to the platform 20 when the propeller shaft 17 does not rotate about its central axis. In some cases, the propeller shaft 17 may rotate about its central axis when the pod 19 does not rotate about an azimuthal axis 56 relative to the platform 20. In other cases, the propeller shaft 17 may rotate about the central axis while the pod 19 rotates about the azimuthal axis 56 relative to the platform 20.

Figure 9:
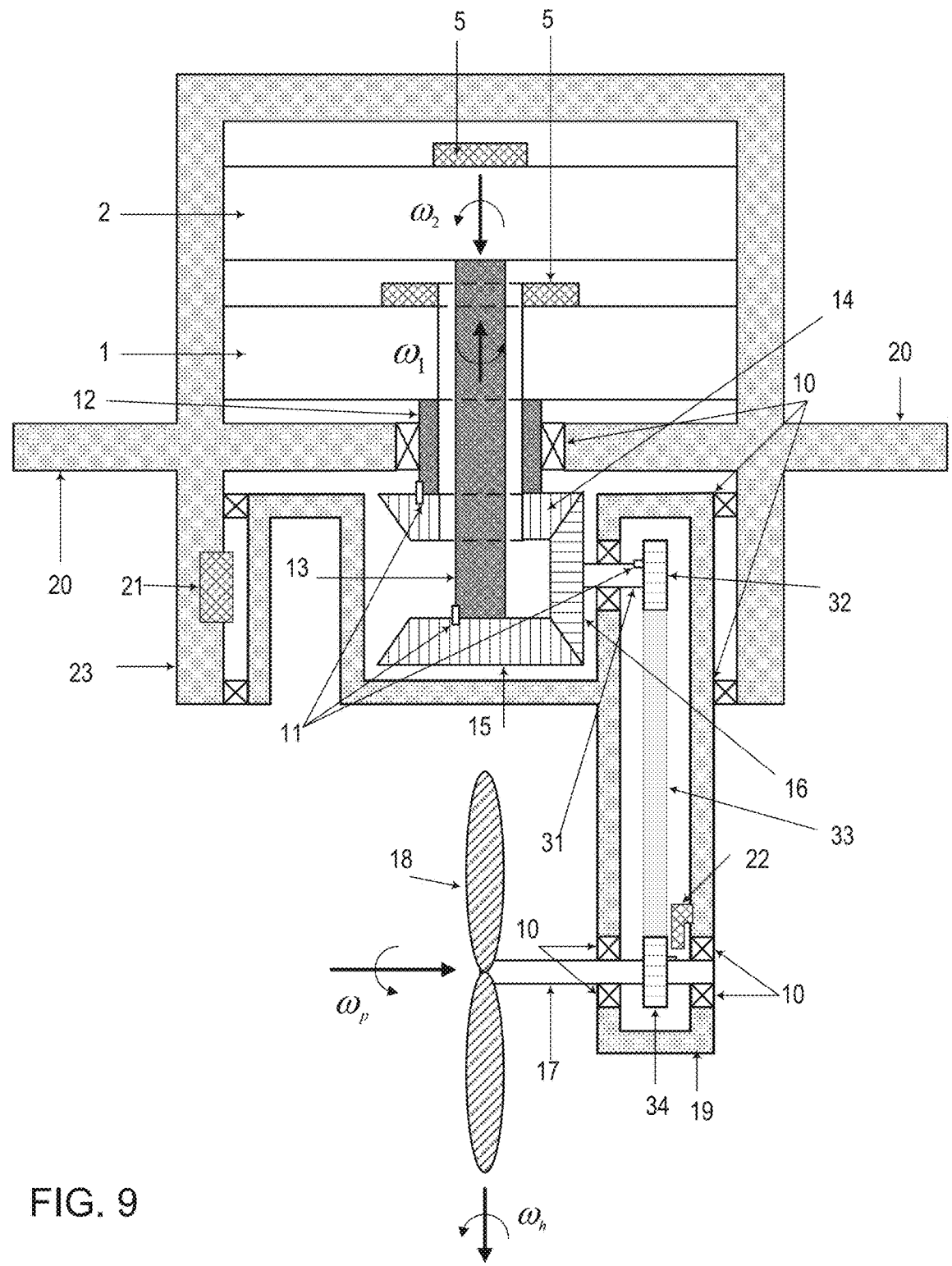
FIG. 9 is a cross-sectional view showing an example azimuth thruster system with an additional power train mechanism installed outside of a pod.

FIG. 9 shows an illustrative implementation where the torque transmitted through the shaft 31 is delivered to the propeller 18 indirectly via a first pulley or sprocket 32, timing belt or chain 33, a second pulley or sprocket 34, and propeller shaft 17, successively. Since the pod containing several gears and therefore being voluminous can be located inside the hull, this implementation may be beneficial in reducing the drag caused by the pod. This architecture may be suitable for outboard motor system often used for small leisure boats and fishing boats, etc. Here, the timing belt or chain and the related mechanical components can be replaced by gear train composed of a series of gears. For example, the pulley or sprocket 32 and 34 may be replaced by two bevel gears and the timing belt or chain 33 can be replaced by a long vertical shaft engraved with bevel gears at both ends.

Figure 10:
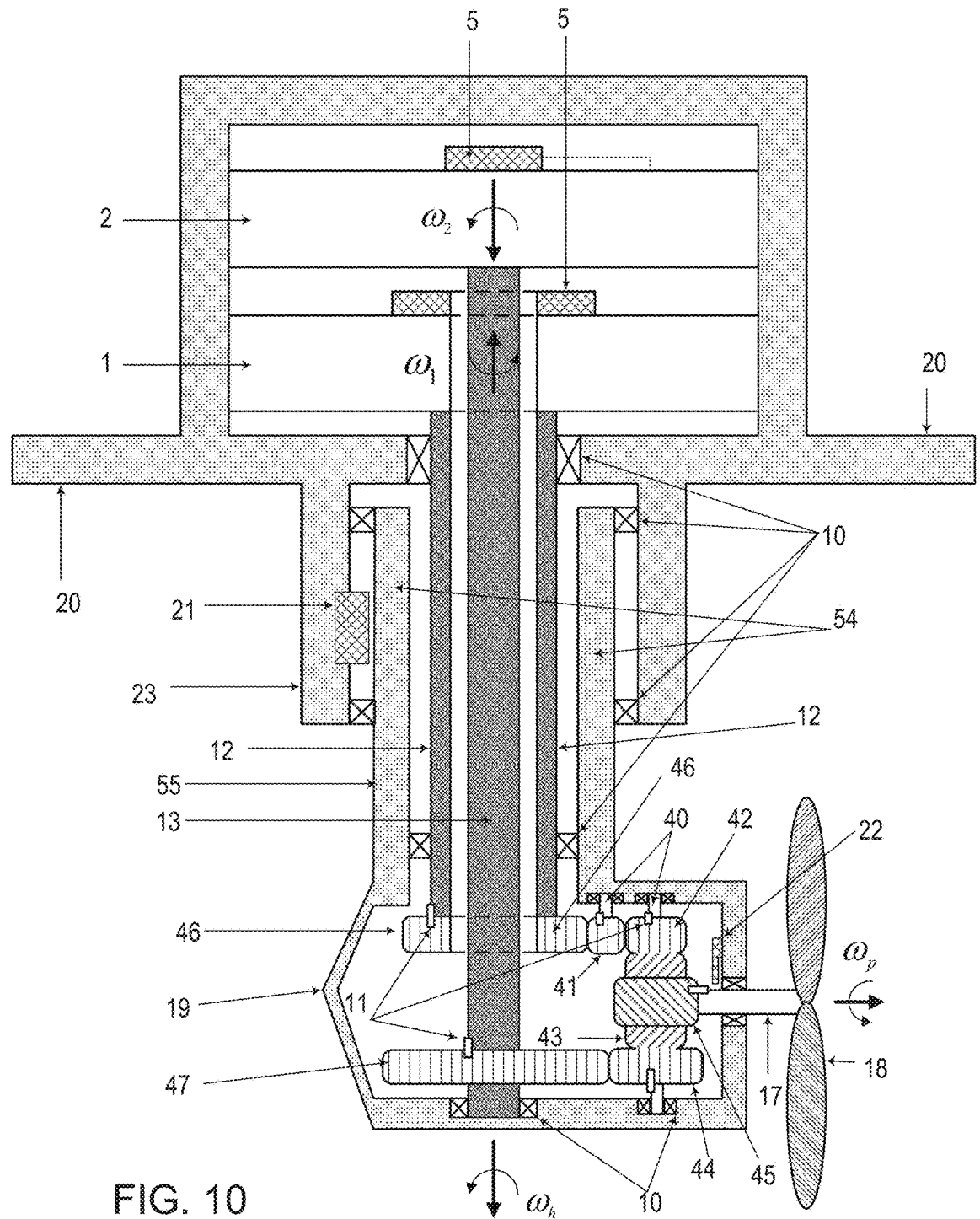
FIG. 10 is a cross-sectional view showing an example azimuth thruster system showing a plurality of spurs or helical gears provided inside the pod.

FIG. 10 shows another implementation where instead of using bevel gears a multiplicity of spur or helical gears are employed inside the pod 54. In this architecture, there are two points that need attention. Firstly, the spur or helical gear 42, the helical gear 43, and the spur or helical gear 44 compose a single body, where the gear 42 engages with the gear 41, the gear 44 engages with the gear 47, and the helical gear 43 engages in crossed fashion with the helical gear 45 that drives the propeller 18 through the shaft 17. Secondly, in order for the two primary prime movers fixed to the hull to be able to cooperatively drive the propeller and steer the pod at the same time, the two gears 46 and 47, respectively attached to the two coaxial shafts 12 and 13, are required to be able to rotate in relatively opposite direction to drive propeller while maintaining the same azimuth of the pod 54. To satisfy this requirement, in this illustrative implementation, a connecting gear 41 is introduced between the two gears 46 and 42. There exist infinite degrees of freedom in the design that can satisfy the requirement. However, in view of the symmetry of the two drive trains associated with two primary prime movers, it is preferable to keep the equality in the gear ratios between gears 46 and 42 and between gears 47 and 44.

Figure 11:
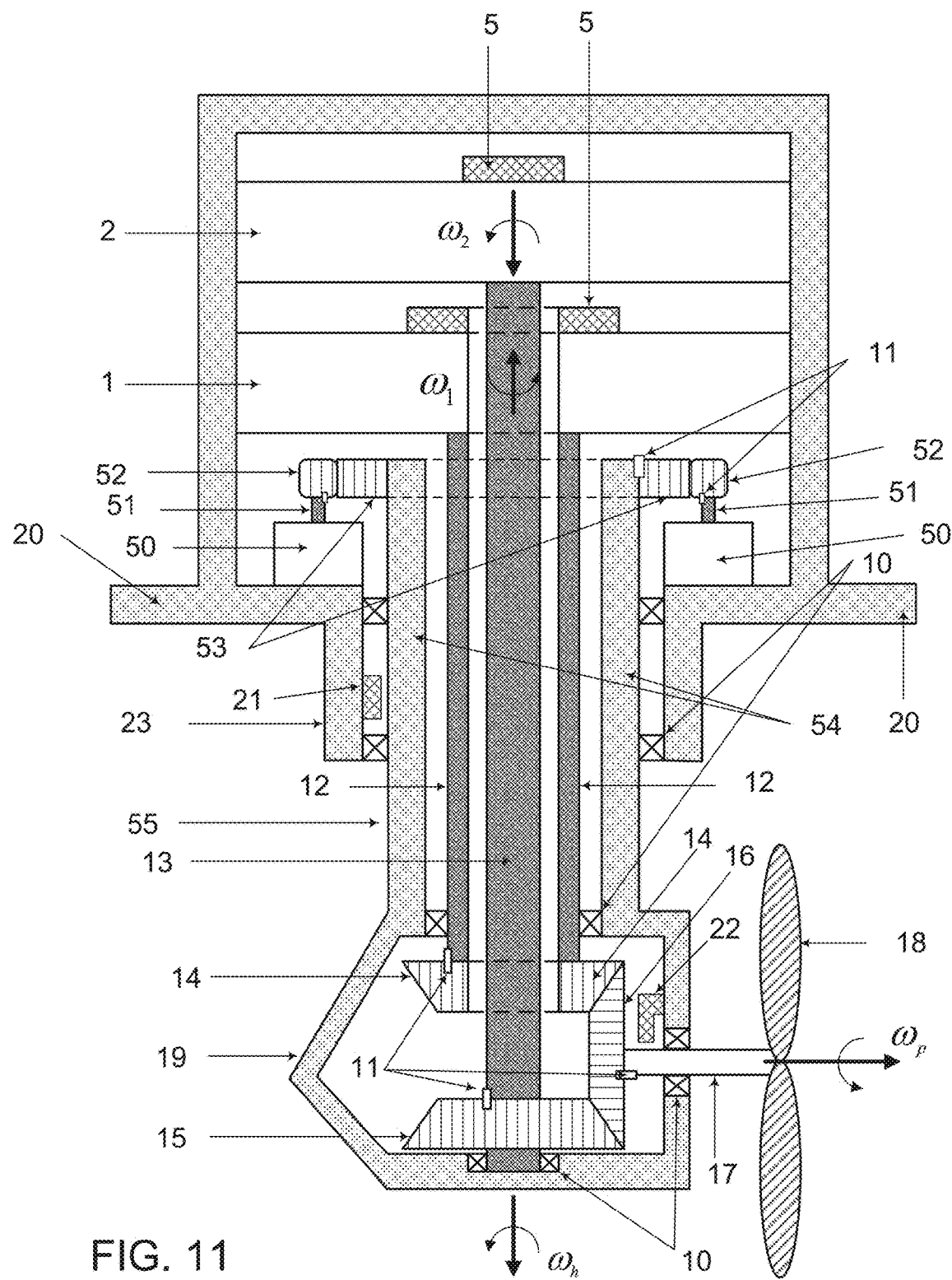
FIG. 11 is a cross-sectional view showing an example azimuth thruster system with a fault-tolerant system by adding at least one auxiliary third prime mover dedicated to rotate the pod.

FIG. 11 shows an implementation of an azimuth thruster system that is capable of a fault-tolerant operation of the system. In this example, an auxiliary third prime mover 50 or an auxiliary prime mover is added to the system depicted in FIG. 4. Through the shaft 51, the auxiliary third prime mover 50 rotates the pinion gear 52 engaged with the ring gear 53. Then the rotational motion of the ring gear 53 installed on the cylindrical portion 55 of the pod 54 creates azimuthal change of the pod 54. The purpose of the auxiliary third prime mover 50 may include providing auxiliary azimuth control torque during normal operation whenever necessary and to undertake the whole role of azimuth control when either one of the first and second primary prime movers 1 and 2 is not operable.

For example, when either one of the two primary prime movers 1 and 2 is not controllable or inoperable, although cooperation of the two primary prime movers in controlling both the speed of the propeller and the azimuth of the pod may not be possible, the remaining controllable primary prime mover and the auxiliary third prime mover 50 can be used to continuously operate the azimuth thruster system in an independent fashion. In other words, the controllable primary prime mover may undertake control of the speed of the propeller and the auxiliary third prime mover may undertake control the azimuth of the pod. In this case, since the propeller thrust is provided by a single primary prime mover, the propeller thrust power may be reduced by half, for instance.

Described are example implementations for an azimuth thruster system and example control methods for the system, where two primary prime movers can mechanically share the efforts both in generating propeller thrust and in controlling azimuth of propeller thrust.

A number of illustrative implementations have been described above. Nevertheless, it will be understood that various modifications are possible. For example, suitable results may be achieved if two groups of prime movers instead of two primary prime movers may be used to distribute the power requirement. Accordingly, other implementations are within the scope of the following claims.

What is claimed is:
1. An azimuth thruster system for a vessel, the system comprising:
 a pod configured to rotate relative to the vessel about an azimuthal axis of the pod;
 a propeller shaft extending from the pod and being configured to rotate relative to the pod about a central axis of the propeller shaft;
 an outer shaft disposed at least partially in the pod, and extending along the azimuthal axis of the pod, the outer shaft configured to be driven by a first primary prime mover;
 an inner shaft disposed at least partially within the outer shaft and extending along the azimuthal axis of the pod, the inner shaft configured to be driven by a second primary prime mover; and
 a pod gear unit disposed within the pod, the pod gear unit coupled to the outer shaft, the inner shaft, and the propeller shaft,
 wherein the outer and inner shafts are configured to rotate at least one of the pod or the propeller shaft based on directions and magnitudes of a torque generated by the first and second primary prime movers.

2. The system according to claim 1, wherein the pod gear unit comprises:
   a first bevel gear coupled to the outer shaft and configured to be rotated about the azimuthal axis of the pod by the outer shaft;
   a second bevel gear coupled to the inner shaft and configured to be rotated about the azimuthal axis of the pod by the inner shaft; and
   a joint bevel gear engaged with the first and second bevel gears and coupled to the propeller shaft, and
   wherein the joint bevel gear is configured, based on rotation of the first and second bevel gears, to (i) rotate the propeller shaft about the central axis or (ii) rotate the pod about the azimuthal axis of the pod.

3. The system according to claim 1, wherein the pod comprises:
   a gear housing portion accommodating the pod gear unit and supporting the propeller shaft; and
   a cylindrical portion extending from the gear housing portion and surrounding at least a portion of the outer shaft,
   wherein the gear housing portion is configured to receive a force from the propeller shaft and to rotate the pod about the azimuthal axis of the pod.

4. The system according to claim 1, further comprising:
   two or more prime movers each configured to generate torque for driving both the pod and the propeller shaft, the two or more prime movers including the first primary prime mover and the second primary prime mover;
   a first transfer gear coupled to the first primary prime mover and configured to transfer a first torque generated from the first primary prime mover to the outer shaft; and
   a second transfer gear coupled to the second primary prime mover and configured to transfer a second torque from the second primary prime mover to the inner shaft.

5. The system according to claim 1, wherein the outer and inner shafts are coaxially arranged and configured to independently rotate about the azimuthal axis of the pod.

6. The system according to claim 4, wherein the two or more prime movers comprise an auxiliary third prime mover that is coupled to the vessel or to the pod and that is configured to generate torque for driving the pod about the azimuthal axis, and
   wherein the system further comprises a drive train coupled to the auxiliary third prime mover, the drive train being configured to transfer the torque generated from the auxiliary third prime mover to the pod for rotating the pod about the azimuthal axis of the pod.

7. The system according to claim 6, further comprising a fault-tolerant system that includes the first and second primary prime movers and the auxiliary third prime mover,
   wherein the fault-tolerant system is configured, based on one of the first and second primary prime movers being inoperable, to dedicate the auxiliary third prime mover to drive the pod for azimuth control and maintain the other of the first and second primary prime movers to drive the propeller shaft.

8. The system according to claim 4, wherein the two or more prime movers are configured, based on the first and second primary prime movers generating torque in a same direction to each other, to rotate the pod about the azimuthal axis relative to the vessel without causing rotation of the propeller shaft about the central axis, and
   wherein the two or more prime movers are further configured, based on the first and second primary prime movers generating torque in opposite directions to each other, to rotate the propeller shaft about the central axis without causing rotation of the pod about the azimuthal axis.

9. The system according to claim 1, further comprising a pulley unit located between the pod gear unit and the propeller shaft, the pulley unit configured to transfer rotational force from the pod gear unit to the propeller shaft,
   wherein the pulley unit includes at least one of a pulley, a belt, a sprocket, or a chain.

10. The system according to claim 1, further comprising a plurality of propeller shafts and a plurality of propellers coupled to the plurality of propeller shafts, respectively.

11. The system according to claim 1, wherein the propeller shaft is not squarely angled relative to the azimuthal axis.

12. The system according to claim 4, wherein the first transfer gear includes a plurality of gears engaged to each other and configured to translate the first torque to rotation of the outer shaft about the azimuthal axis, and
   wherein the second transfer gear includes a plurality of gears engaged to each other and configured to translate the second torque to rotation of the inner shaft about the azimuthal axis.

13. The system according to claim 1, wherein the pod gear unit comprises:
   a first gear coupled to the outer shaft and configured to be rotated about the azimuthal axis of the pod by the outer shaft;
   a second gear coupled to the inner shaft and configured to be rotated about the azimuthal axis of the pod by the inner shaft; and
   at least one helical gear engaged with the first and second gears and coupled to the propeller shaft, and
   wherein the at least one helical gear is configured, based on rotation of the first and second gears, to (i) rotate the propeller shaft about the central axis or (ii) rotate the pod about the azimuthal axis of the pod.

14. An azimuth thruster system for a vessel, the system comprising:
   a pod protruding from the vessel and configured to rotate about an azimuthal axis relative to the vessel;
   a propeller shaft extending from the pod and configured to rotate relative to the pod about a central axis of the propeller shaft;
   a first and second primary prime mover each configured to generate power for driving both the pod and the propeller shaft;
   an outer shaft disposed at least partially in the pod and extending along the azimuthal axis of the pod, the outer shaft being configured to be driven by the first primary prime mover;
   an inner shaft disposed at least partially in the outer shaft and extending along the azimuthal axis of the pod, the inner shaft being configured to be driven by the second primary prime mover;
   a pod gear unit disposed within the pod, the pod gear unit rotatably coupled to the outer shaft, the inner shaft, and the propeller shaft;
   a first transfer gear coupled to the first primary prime mover and configured to translate first torque generated from the first primary prime mover to rotation of the outer shaft;

a second transfer gear coupled to the second primary prime mover and configured to translate second torque from the second primary prime mover to rotation of the inner shaft;
an azimuth sensor configured to measure a current azimuthal angle of the pod about the azimuthal axis relative to the vessel;
an angular speed sensor configured to measure a current rotational speed of the propeller shaft; and
a controller configured to, based on the measured current azimuthal angle of the pod and the measured current rotational speed of the propeller shaft, control the first and second primary prime movers to cause at least one of rotation of the pod about the azimuthal axis relative to the vessel or rotation of the propeller shaft about the central axis.

15. The system according to claim 14, wherein the controller is further configured to control the first and second primary prime movers to cause rotation of the pod about the azimuthal axis relative to the vessel, while restricting rotation of the propeller shaft about the central axis relative to the pod, and
wherein the controller is further configured to control the first and second primary prime movers to cause rotation of the propeller shaft relative to the pod about the central axis of the propeller shaft, while restricting rotation of the pod about the azimuthal axis relative to the vessel.

* * * * *